US010380584B2

(12) United States Patent
Lore et al.

(10) Patent No.: US 10,380,584 B2
(45) Date of Patent: Aug. 13, 2019

(54) PROCESSING TRANSACTIONS USING CONVERTIBLE OPTIMIZED ATTRIBUTE PACKAGES

(71) Applicant: JPMorgan Chase Bank, N.A., New York, NY (US)

(72) Inventors: Nicholas M. Lore, Pearl River, NY (US); Brian S. Gantert, Hockessin, DE (US); Richard W. McMillen, Media, PA (US); Sanjay Durgadin, Hockessin, DE (US); Daryl Wooldridge, Lombard, IL (US); Joseph Arnone, Swedesboro, NJ (US); Heather Spinnenweber, Berwyn, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 678 days.

(21) Appl. No.: 14/924,593

(22) Filed: Oct. 27, 2015

(65) Prior Publication Data
US 2017/0116601 A1    Apr. 27, 2017

(51) Int. Cl.
*G06Q 40/00* (2012.01)
*G06Q 20/38* (2012.01)
(Continued)

(52) U.S. Cl.
CPC ..... *G06Q 20/3825* (2013.01); *G06Q 20/3224* (2013.01); *G06Q 20/3278* (2013.01); *G06Q 20/405* (2013.01); *G06Q 20/42* (2013.01)

(58) Field of Classification Search
CPC .............. G06Q 40/00; G06Q 20/3825; G06Q 20/3278; G06Q 20/42; G06Q 20/10; G06Q 20/102
(Continued)

(56) References Cited

U.S. PATENT DOCUMENTS 9,092,767 B1 *   7/2015   Andrews .............. G06Q 20/227
2006/0165060 A1 * 7/2006   Dua ....................... G06O 20/20
                                                            370/352

(Continued)

OTHER PUBLICATIONS

Airtel, I&M Partner to Increase Financial Inclusion, by Baraka Jefwa. Africa News Service: NA. COMTEX News Network, Inc. (Oct. 5, 2015) (Year: 2015).*

*Primary Examiner* — Lalita M Hamilton
(74) *Attorney, Agent, or Firm* — Greenblum & Bernstein P.L.C.

(57) ABSTRACT

In one embodiment, a method includes receiving an indication that a user has initiated a transaction and determining whether location information identifying a location of the transaction was received. A first attribute package of a plurality of attribute packages of the user may be identified based on customized rules and, if received, based on the location information. An identification of the first attribute package may be sent to the user's client system as a recommended payment attribute package for processing the transaction. In response to the identification of the first attribute package, the transaction may be opened, and a payment attribute package for the transaction may be set to the first attribute package. The transaction may be held open for a predetermined period of time to allow the user to modify the payment attribute package for the transaction to a different attribute package.

16 Claims, 6 Drawing Sheets

(51) Int. Cl.
*G06Q 20/32* (2012.01)
*G06Q 20/42* (2012.01)
*G06Q 20/40* (2012.01)

(58) Field of Classification Search
USPC .......................................................... 705/39
See application file for complete search history.

(56) References Cited

U.S. PATENT DOCUMENTS

| | | | |
|---|---|---|---|
| 2008/0010215 A1* | 1/2008 | Rackley, III | G06Q 20/042 705/70 |
| 2013/0013499 A1* | 1/2013 | Kalgi | G06Q 20/12 705/41 |
| 2013/0246261 A1* | 9/2013 | Purves | G06Q 20/105 705/41 |
| 2014/0074637 A1* | 3/2014 | Hammad | G06Q 20/12 705/21 |
| 2016/0034891 A1* | 2/2016 | Carpenter | G06Q 20/40 705/44 |
| 2016/0379213 A1* | 12/2016 | Isaacson | G06Q 20/12 705/44 |
| 2017/0243192 A1* | 8/2017 | Andrews | G06Q 20/227 |
| 2017/0345105 A1* | 11/2017 | Isaacson | G06F 3/048 |
| 2017/0372301 A1* | 12/2017 | Theurer | G06Q 20/28 |
| 2018/0012147 A1* | 1/2018 | Hammad | G06Q 10/00 |

* cited by examiner

US 10,380,584 B2

PROCESSING TRANSACTIONS USING CONVERTIBLE OPTIMIZED ATTRIBUTE PACKAGES

TECHNICAL FIELD

This disclosure generally relates to processing transactions and, more particularly, to processing transactions using location information.

BACKGROUND

Customers often purchase products or services using a physical or virtual card, such as a debit or credit card, which may be tied to one or more accounts and/or one or more attribute packages of the customer. Some customers use a mobile application stored on a mobile device, such as a mobile phone, to make such purchases.

SUMMARY OF EXAMPLE EMBODIMENTS

In one embodiment, a method includes receiving an indication that a user has initiated a transaction and determining whether location information identifying a location of the transaction was received. A first attribute package of a plurality of attribute packages of the user may be identified based on customized rules and, if received, based on the location information. An identification of the first attribute package may be sent to the user's client system as a recommended payment attribute package for processing the transaction. In response to the identification of the first attribute package, the transaction may be opened, and a payment attribute package for the transaction may be set to the first attribute package. The transaction may be held open for a predetermined period of time to allow the user to modify the payment attribute package for the transaction to a different attribute package.

DESCRIPTION OF EXAMPLE EMBODIMENTS

Figure 1:
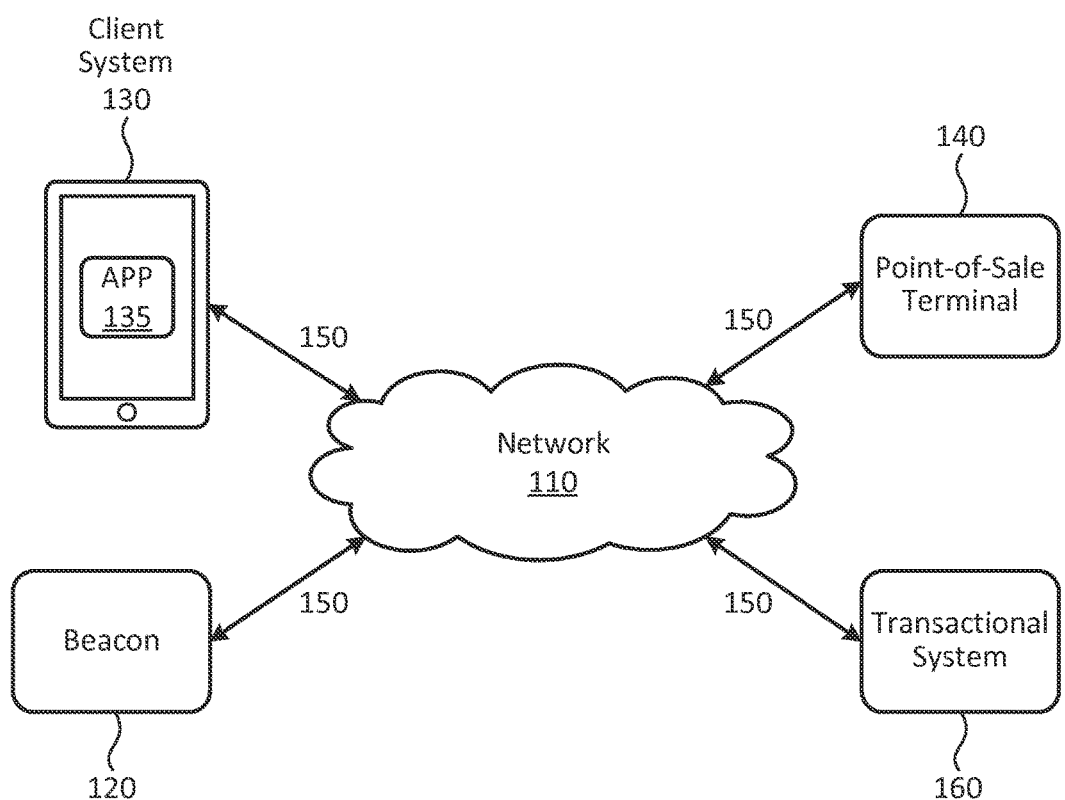
FIG. 1 illustrates an example network environment associated with a transactional system.

A customer's attribute package may have one or more accounts linked to multiple attribute packages, and each of the attribute packages may be accessed by the user via a single payment method (e.g., a physical or virtual card linked to multiple attribute packages). The user may initiate a transaction for the purchase of a good or service by providing the payment method, for example, at a point-of-sale terminal. The user may then select, at the point-of-sale terminal, which of the multiple, linked attribute packages to which the transaction should be charged (e.g., debit or credit). Certain embodiments of the present disclosure provide an ability to determine for the customer which of the multiple attribute packages—or which combination of the multiple attribute packages—would present the highest value to the customer if applied to the transaction and to suggest an attribute package to be used for the transaction. Certain embodiments may provide the customer with a post-transaction window of time to review and modify the payment attribute package for the transaction. These and other concepts are described in greater detail below in the context of example embodiments of the present disclosure.

Particular embodiments provide methods and systems for processing a transaction initiated by a user at, for example, a point-of-sale terminal in a third-party store. The user may provide, for payment, a single payment method connected to more than one attribute package. A transactional system may determine and provide as a recommendation to the user, which of the user's multiple attribute packages would provide the greatest value to the user (e.g., in cash-back or rewards points) if used to process the transaction. The determination of the recommended payment attribute package may be based on location information of a transaction (e.g., information indicating that the user is at a particular store or geographic location), if received by the transactional system. For example, the transactional system may determine a particular retail-store credit-card attribute package may be the best attribute package for the user to apply to a transaction at the particular retail-store, and the transactional system may determine that the user is transacting at the particular retail-store based on received location information.

The transactional system may open the transaction, setting the payment attribute package to the recommended payment attribute package. The transactional system may then hold the transaction open for a predetermined window of time in order to allow the user to modify the payment attribute package from the recommended payment attribute package to a different one of the user's multiple attribute packages. The user may be prompted, by an application running on a client system of the user, the application communicating with the transactional system, to confirm the recommended payment attribute package or to select an alternate payment attribute package. The user may also be prompted to set a reminder to review the pending transaction at a time during the window of time in which it is being held open in order to potentially modify the payment attribute package to a different attribute package than the recommended payment attribute package.

FIG. 1 illustrates an example network environment 100 associated with a transactional system. Network environment 100 includes a beacon 120, a client system 130, a point-of-sale terminal 140, and a transactional system 160, connected to each other by a network 110. Although FIG. 1 illustrates a particular arrangement of beacon 120, client system 130, point-of-sale terminal 140, transactional system 160, and network 110, this disclosure contemplates any suitable arrangement of beacon 120, client system 130, point-of-sale terminal 140, transactional system 160, and network 110. As an example, two or more of beacon 120, client system 130, point-of-sale terminal 140, transactional system 160 may be connected to each other directly, bypassing network 110. As another example, two or more of beacon 120, client system 130, point-of-sale terminal 140, transactional system 160 may be physically or logically co-located with each other in whole or in part. Moreover, although FIG. 1 illustrates a particular number of beacons 120, client systems 130, point-of-sale terminals 140, transactional systems 160, and networks 110, this disclosure contemplates any suitable number of beacons 120, client systems 130, point-of-sale terminals 140, transactional systems 160, and networks 110. As an example, network environment 100 may include multiple beacons 120, client systems 130, point-of-sale terminals 140, transactional systems 160, and networks 110. Additionally, although network environment 100 is illustrated and described as including particular components, this disclosure contemplates network environment 100 being implemented using any suitable combination of components.

This disclosure contemplates any suitable network 110. As an example, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect beacon 120, client system 130, point-of-sale terminal 140, and transactional system 160 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, beacon 120 may be a geographic-positioning-capable device or system associated with a third party. As used herein, beacon 120 may be any static or dynamic device suitable for communicating wirelessly with any number of client systems 130 proximate to the beacon 120. Beacon 120 may be communicatively-coupled to a third-party and able to communicate wirelessly with transactional system 160. Beacon 120 may be able to communicate wirelessly with point-of-sale terminal 140. Beacon 120 may send and receive wireless communications via, for example, radio-frequency identification, near-field communication, ultrasonic waves, BLUETOOTH, BLUETOOTH low energy, IBEACON protocols, EDDYSTONE protocols, or any other suitable wireless communication method, particularly short-range wireless communication methods. A third-party may be associated with multiple beacons 120, and each beacon may be fixed, removably or permanently, at a location within a place of the third-party. For example, the third-party may be a merchant, and there may be multiple beacons 120 dispersed throughout a store of the merchant. Although this disclosure describes beacons 120 in a particular manner, this disclosure contemplates any suitable beacons 120 for wirelessly communicating with one or more client system 130.

In particular embodiments, client system 130 may be an electronic device including hardware, software, or embedded logic components or a combination of two or more such components and capable of carrying out the appropriate functionalities implemented or supported by client system 130. As an example, a client system 130 may include a computer system such as a desktop computer, notebook or laptop computer, netbook, a tablet computer, e-book reader, GPS device, camera, personal digital assistant (PDA), hand-held electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include an application 135. Application 135 may be any suitable application associated with transactional system 140. Application 135 may be a native application running on client system 130. Application 135 may facilitate user-initiated transactions between an attribute package of the user and a third-party (e.g., a merchant). Application 135 may communicate wirelessly with point-of-sale terminal 140 and transactional system 160. Application 135 may be launched by user input at an interface of client system 130 or automatically based on settings (e.g., set by the user at client system 130). As an example, application 135 may be automatically launched (e.g., running in the background on client system 130) in response to a communication from a beacon 120, point-of-sale terminal 140, or transactional system 160. As another example, point-of-sale terminal 140 may send a notification to application 135 that a user has initiated a transaction at point-of-sale terminal 140 (e.g., using a card associated with transactional system 160), and the notification may cause client system 130 to launch application 135. Application 135 may be capable of providing prompts and any other suitable notifications for display to the user on an interface of client system 130.

In particular embodiments, point-of-sale terminal 140 may be any suitable computing system for communicating with transactional system 160 to open, close, and process a transaction. In particular embodiments, point-of-sale terminal 140 may be a beacon 120. In particular embodiments, point-of-sale terminal 140 may be communicatively coupled to one or more beacons 120. Point-of-sale terminal 140 may comprise one or more interfaces for receiving a user's payment credentials (e.g., a credit-card reader). Point-of-sale terminal 140 may be able to communicate wirelessly either directly or via network 110 with beacon 120, client system 130, and transactional system 160. As an example, point-of-sale terminal 140 may be able to communicate with client system 130 (e.g., via BLUETOOTH, near-field communication, or any other suitable short-range radio frequency signal) to obtain payment credentials of the user stored on client system 130 (e.g., by application 135).

In particular embodiments, transactional system 160 may be a network-addressable computing system that can host an online transactional system. Transactional system 160 may be accessed by the other components of network environment 100 either directly or via network 110. As an example, client system 130 may access transactional system 160 using a web browser or a native application (e.g., application 135) either directly or via network 110. In particular embodiments, transactional system 160 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof.

In particular embodiments, each server may include hardware, software, or embedded logic components or a combination of two or more such components for carrying out the appropriate functionalities implemented or supported by the server. In particular embodiments, transactional system 160 may include one or more data stores. Data stores may be used to store various types of information. In particular embodiments, the information stored in the data stores may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable beacon 120, client system 130, point-of-sale terminal 140, and transactional system 160 to manage, retrieve, modify, add, or delete, the information stored in the data stores.

Figure 2:
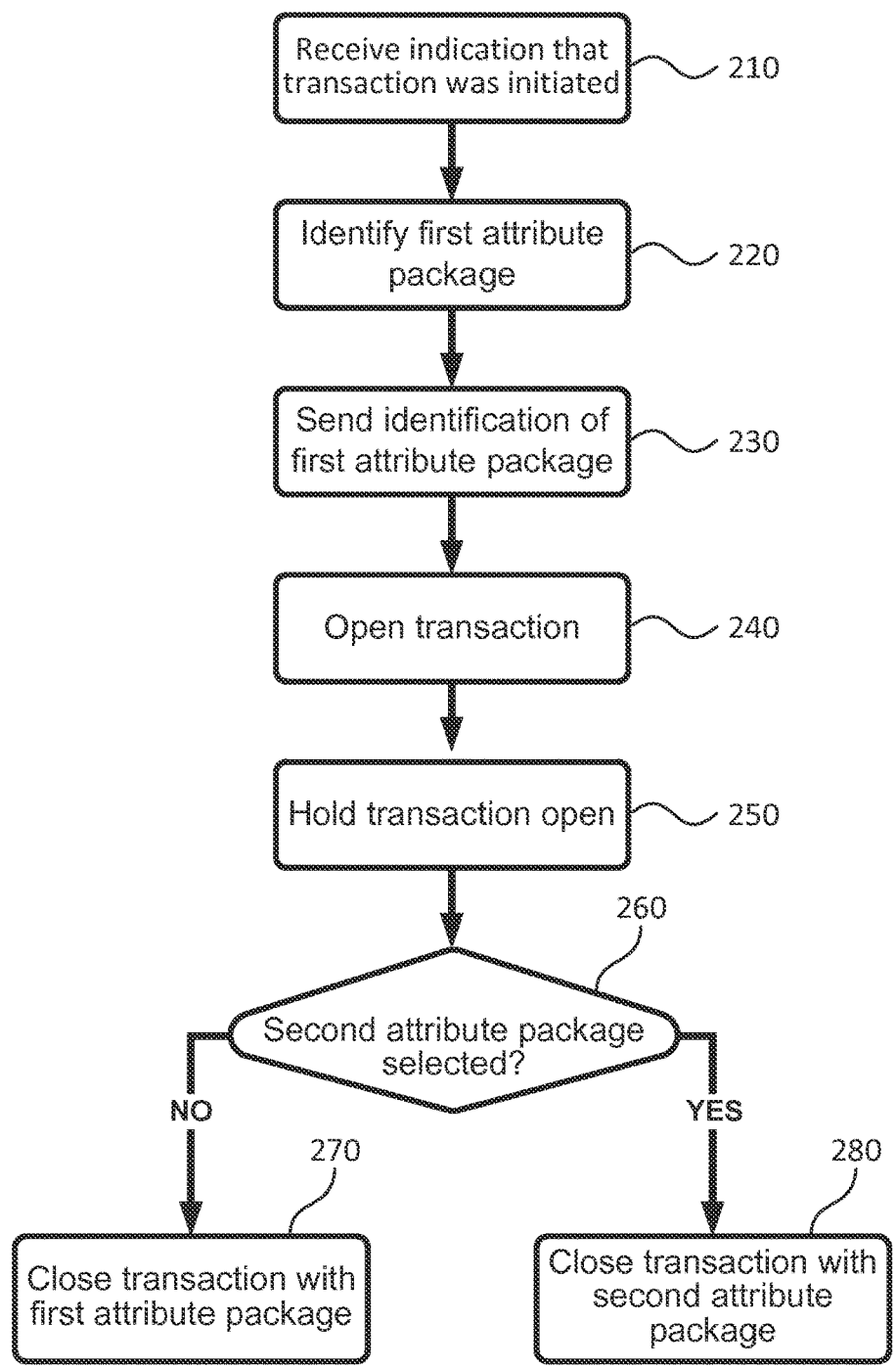
FIG. 2 is a flowchart illustrating an example method for processing a transaction.

FIG. 2 is a flowchart 200 of illustrative steps for processing a transaction. In particular embodiments, the steps of flowchart 500 may be implemented by one or more computing devices of transactional system 160. In particular embodiments, the steps of flowchart 500 may be implemented in order to process a transaction, which may correspond to, as an example, a transaction between a user and a third-party (e.g., a merchant). At step 210, transactional system 160 receives an indication that a transaction was initiated. The indication may be sent from, as an example, one or more beacons 120, point-of-sale terminal 140, or application 135 running on client system 130. As an example, application 135 may be launched in response to user input received at client system 130 or in response to the transaction being initiated by a user of client system 130 at point-of-sale terminal 140; application 135 may receive details of the transaction from point-of-sale terminal 140; and application 135 may send to transactional system 160 an indication that the transaction was initiated. In particular embodiments, the indication that the transaction was initiated may include price information (e.g., prices for each of the products to be purchased, taxes, a sub-total price, and a total price), product information (e.g., an identification of each of the products or services that are subjects of the transaction), merchant information (e.g., an identification of the merchant or third-party with whom the transaction is being initiated), and any other suitable information regarding the transaction.

In particular embodiments, the user may initiate the transaction by providing payment credentials to a third party (e.g., a merchant), and payment credentials may be associated with a plurality of attribute packages. As an example, the user may swipe a payment card, and the payment card may be connected to multiple possible payment attribute packages of the user. As used herein, "payment card" refers any suitable product, hardware, software, or any combination thereof, by which a transaction may be initiated and access granted to one or more attribute packages connected to the payment card. The attribute packages may each be associated with transactional system 160. The attribute packages may include, as an example, debit attribute packages, credit attribute packages, rewards attribute packages, loyalty-point attribute packages, gift-card attribute packages, any other suitable types of payment attribute packages, or any combination thereof. Each attribute package may be associated with particular benefits (e.g., rewards points), protections (e.g., fraud protections), one or more payment lines (e.g., credit, debit, and prepaid lines), fees (e.g., annual or monthly account maintenance fees), any other suitable features, or any combination thereof. The payment card may have a combined credit limit based on the credit limits of multiple credit attribute packages connected to the payment card (e.g., a sum of the credit limits or another suitable combination of the credit limits).

In response to the received indication that the user has initiated a transaction, at step 520, transactional system 160 identifies a first attribute package of a plurality of attribute packages of the user based on one or more customized rules associated with the user. In particular embodiments, the first attribute package may be the optimal attribute package for the transaction based on the value to the user as determined by transactional system 160. Value to the user may be based on provision to the user of information regarding the transaction, including, for example, purchase information (e.g., purchase amount, item/SKU level details of purchase, date/time of transaction), a merchant category (e.g., domestic/international merchant, product type sold by merchant, or any other suitable merchant category), a purchase category (e.g., in-store/online purchase, recurring purchase/payment, or any other suitable purchase category), and any other suitable information regarding the transaction. Value to the user may also be based on, for example, rewards value for the transaction, annual percentage rate (APR), transaction fees (e.g., foreign exchange fees), transactional rewards (e.g., one point per dollar spent), non-transactional bonus rewards (e.g., spend $10,000, get 1,000-point bonus, earn 7% annual bonus, or quarterly bonuses and caps on quarterly bonuses), predicted impact on credit score (e.g., FICO score), credit line availability, insurance, price-purchase protection, merchant specific benefits (e.g., free checked bag when using particular attribute package in transaction with a particular airline), any other suitable benefit or value, or any combination thereof. The customized rules may include, as an example, rules based on user attributes (e.g., user preferences), attributes of each of the attribute packages, attributes of the third party with whom the user is transacting, transaction-specific attributes (e.g., attributes of a product to be purchased, including, for example, price comparison information), any other suitable factors for determining which of the user's attribute packages would bring the most value to the user for the particular transaction, or any combination thereof. For example, transactional system 160 may use a customized rule based on a comparison of the price of a product at a store at which the user is currently located to the price of the product at a different store (e.g., at another brick-and-mortar store or at an online retailer) to provide a recommendation to the user to purchase the product at the different store using a particular attribute package as the purchase at a different store would be more valuable to the user (e.g., the different store is offering a price discount for the product if purchased using a particular attribute package). Customized rules may include, as an example, greatest rewards value for the transaction, lowest APR, rules associated with any other value, convenience or attribute associated with an attribute package, or any combination thereof. Any suitable combination of customized rules may be used to identify a first attribute package for recommendation to the user. For example, the customized rules used may include one or more rules set by transactional system 160 and one or more rules based on user preferences (e.g., user preference may indicate that a particular attribute package should always be used at a particular place). In another example, a user may set rules based on his customer preferences as the default rules to be applied in identifying a first attribute package.

Transactional system 160 may rank the customized rules using any suitable technique. For example, the customized rules may be ranked based on user preferences (e.g., a default set of customized rules may be set based on user preferences). User preferences may be stored by application 135 running on client system 130, transactional system 160, or both. Transactional system 160 may then determine which of the customized rules to apply based on the rankings In particular embodiments, transactional system 160 may determine weights to assign to the rules based on the rankings and may apply, as an example, a weighted combination of the rules in order to identify the first attribute package. Any type of process or algorithm may be employed for assigning, combining, averaging, and performing any other suitable operation on the rankings for each factor and the weights assigned to the factors. In particular embodiments, transactional system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

Transactional system 160 may identify the first attribute package using any suitable technique. As an example, the user may specify in preferences (e.g., via a webpage associated with transactional system 160 or via application 135 running on client system 130) that he prefers to use the attribute package that would earn him the highest number of rewards points for the transaction relative to the other attribute packages of the user. In the same example, a first attribute package of the user may be associated with the highest rewards for the transaction, and a second attribute package of the user may be associated with the lowest APR. Transaction system 160 may identify the first attribute package as the recommended payment attribute package based on the user-specified preference for the attribute package providing the highest rewards over that providing the lowest APR.

In particular embodiments, transactional system 160 may determine whether or not location information indicating a location of the transaction was received. As an example, the location information may indicate a geographic location of client system 130 (e.g., a global-positioning system location), a type of third-party location (e.g., a construction store chain), a particular one of a type of third-party location (e.g., the particular construction store on Frankford Avenue), or any other suitable location information. In particular embodiments, the location information may be received from application 135 running on the client system 130, one or more short-range radio frequency devices proximate to the client system 130 (e.g., beacons 120), point-of-sale terminal 140, or any combination thereof.

Location information may be sent to transactional system 160 at any suitable time. As an example, location information may be sent by one or more beacons 120 to transactional system 160 when the user's client system 130 is confirmed to be in range of the one or more beacons 120. As another example, location information may be sent by point-of-sale terminal 140 at the point-of-sale (e.g., when the user has initiated the transaction by providing payment credentials). Location information may also be sent to transactional system 160 when a user "checks in" at a particular place via an application running on client system 130 (e.g., a social-media applications), taps a near-field communication device at a particular place (e.g., using client system 130), scans a Quick Response (QR) code at a particular place (e.g., using client system 130), interacts with or comes within a particular range of a kiosk at a particular place, or any other suitable technique for determining location information of the user. Whether or not the location information is received by transactional system 160 may depend, as an example, on whether client system 130 has sufficient mobile-network service, sufficient wired or wireless internet connectivity, or both; on whether client system 130 is in range of and able to wirelessly communicate with any other suitable devices proximate to client system 130 (e.g., one or more beacons 120 and/or point-of-sale terminal 140); and on whether the location and/or BLUETOOTH capabilities of client system 130 are turned on. In particular embodiments, a user may be initiating a transaction with a merchant online, and no location information may be received at transactional system 160. When no location information is received at transactional system 160, information regarding the transaction may be sent to transactional system 160 at the point-of-sale (e.g., by point-of-sale terminal 140 or other suitable third-party system). If the location information has been received, transactional system 160 may identify the first attribute package additionally based on the location information. As an example, the location information may indicate that the user is at a particular sporting-equipment store, and transactional system 160 may then determine that the optimal attribute package to use would be an attribute package that is linked to a rewards attribute package associated with the sporting-equipment store.

Figure 3:
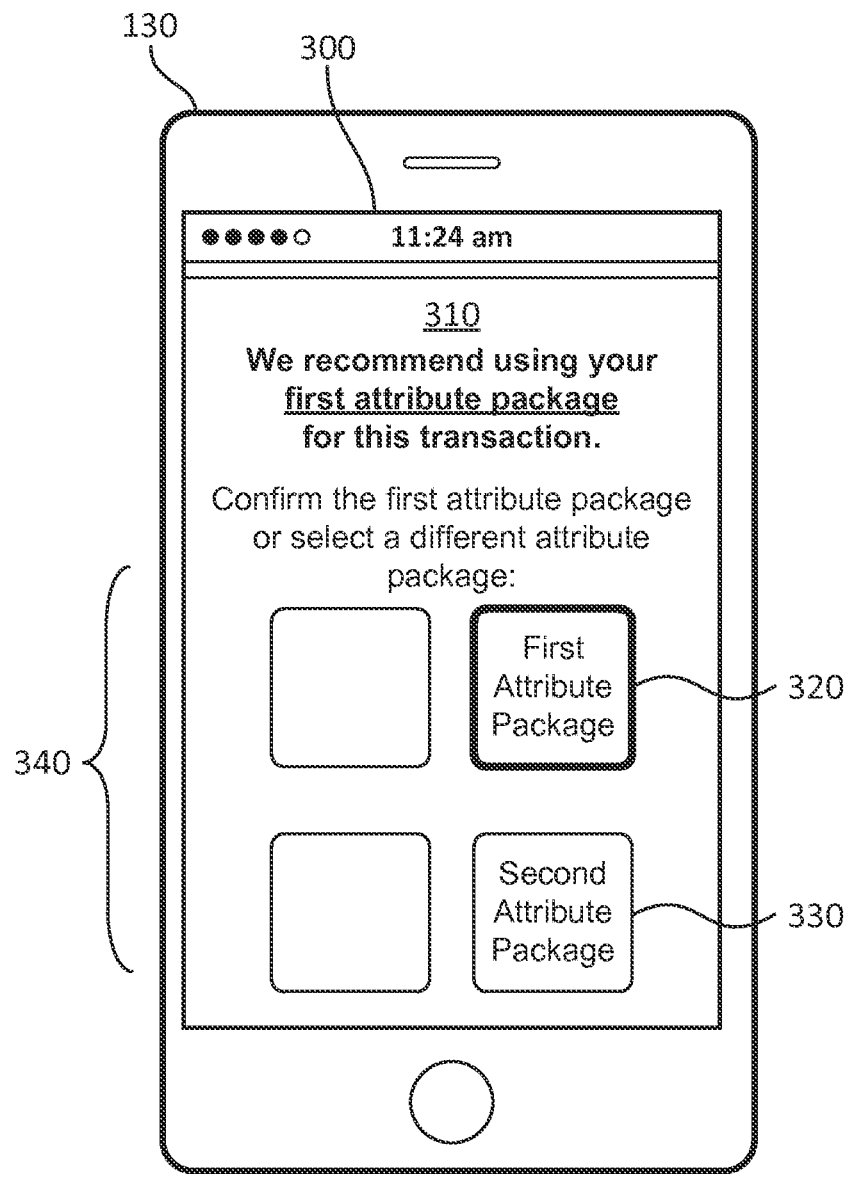
FIG. 3 illustrates an example prompt provided at an interface of a client system.
Figure 4:
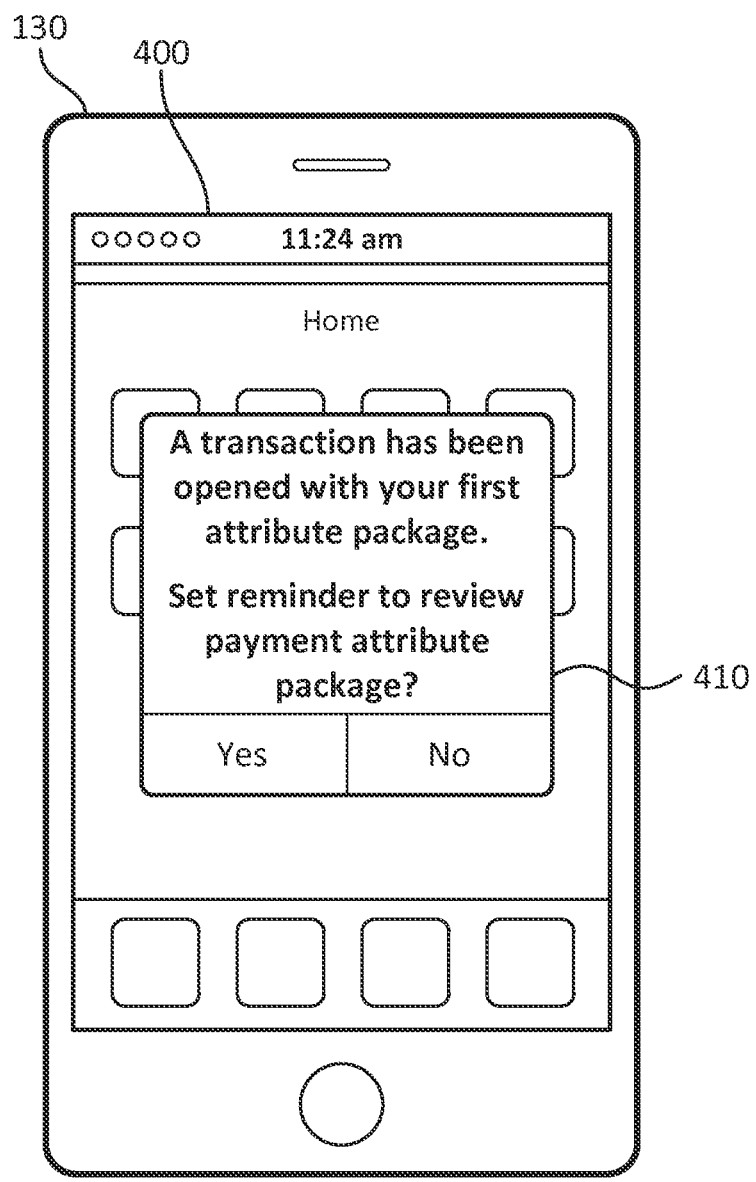
FIG. 4 illustrates an example prompt provided at an interface of a client system.

After the first attribute package has been identified as the recommended payment attribute package for the transaction, transactional system 160 may proceed to step 230 and send an identification of the first attribute package to client system 130 of the user as a recommended payment attribute package for processing the transaction. In particular embodiments, transactional system 160 may send instructions to application 135 running on client system 130 to provide a prompt for display to the user, and the prompt may include the identification of the first attribute package as the recommended payment attribute package for processing the transaction. FIGS. 3 and 4, which are described below, provide example prompts, which may be displayed at an interface of client system 130 or at an interface of point-of-sale terminal 140.

In particular embodiments, as an example, when the location information is received (i.e., client system 130 has service or internet connectivity), the prompt may include a real-time request to confirm the identified first attribute package as the payment attribute package for the transaction or to select a different attribute package of the user's attribute packages as the payment attribute package with which to process the transaction. In particular embodiments, as an example, when the location information is not received (i.e., client system 130 has no or limited service or internet connectivity or the user is transacting online), the prompt may be pushed to client system 130 by one or more beacons 120, point-of-sale terminal 140, or any combination thereof. The prompt may also be pushed to and displayed at point-of-sale terminal 140. In the same example, the prompt may include a notification of the recommended payment attribute package and that the transaction has been initiated. In particular embodiments, the prompt may also include a selectable element or tool by which the user may set a reminder for the user to modify the payment attribute package for the transaction at a later time. As an example, the reminder may be an alarm on client system 130 or a notification displayed to the user at client system 130 by application 135 (e.g., a push notification).

In response to the identification of the first attribute package in step 220, at step 240, transactional system 160 may open the transaction. The payment attribute package for the transaction may be set to the first attribute package, which is the recommended payment attribute package. The transaction may be pending until closed. After the transaction has been opened, transactional system 160 may proceed to step 250 and hold the transaction open (i.e., pending) for a predetermined period of time to allow the user to modify the payment attribute package for the transaction to a different attribute package of the plurality of attribute packages. During the predetermined period of time, the user of client system 130 may change the payment attribute package, which may be set to the first attribute package, which is the recommended payment attribute package, in step 240. As an example, the user may input a response at client system 130 to one or more of the prompts described in connection with step 230 in order to modify the set payment attribute package for the transaction. In particular embodiments, the user may modify the set payment attribute package using application 135 running on client system 130 (e.g., by interacting with a push notification generated by application 135), via a webpage associated with transactional system 160, which may be accessed by client system 130, or by sending an email to transactional system 160 (e.g., via client system 130). In particular embodiments, the user may modify the set payment attribute package for the transaction via a webpage associated with transactional system 160, application 135 running on client system 130, point-of-sale terminal 140, one or more beacons 120, any other suitable method of communicating with transactional system 160, or any combination thereof. In particular embodiments, the user may modify the set payment attribute package by contacting customer service associated with transactional system 160 (e.g., by phone or at a physical branch location), using automated voice response unit (VRU), using interactive notifications (e.g., push alerts, text messages) received at client system 130, or using any other secure channels to modify the set payment attribute package.

In particular embodiments, the length of time that the transaction is held open in step 250 may be determined by transactional system 160 based on one or more attributes of the user, one or more attributes of the transaction, one or more attributes of the third-party with whom the user is transacting, any other suitable factors, or any combination thereof. Transactional system 160 may determine the length of the predetermined period of time based on the credit score of the user. As an example, a user with a lower credit score may have be given a shorter period of time (e.g., 5 hours) in which the payment attribute package may be modified, as opposed to a user with a higher credit score, who may be given a longer period of time in which the payment attribute package may be modified (e.g., 12 hours). Transactional system 160 may determine the length of the predetermined period of time based on one or more attributes of the particular third party with whom the user is transacting. As an example, transactional system 160 may set the predetermined period of time as a shorter window for certain third parties and a longer window for other third parties based on the requirements of the respective third parties. Transactional system 160 may determine the length of the predetermined period of time based on one or more attributes of the particular payment attribute package. As an example, certain payment attribute packages may have requirements that allow the transaction to be pending for a shorter time period before it is either closed or cancelled.

At the end of the predetermined period of time in step 250, transactional system 160 may proceed to step 260 and determine whether the user made a selection of a second attribute package (i.e., a different attribute package than the first attribute package from the plurality of attribute packages of the user) as the payment attribute package for the transaction during the predetermined period of time. In particular embodiments, transactional system 160 may receive an indication that the user selected a second attribute package—or confirmed the first attribute package—at any time during the predetermined period of time. Transaction system 160 may receive this indication from, as an example, application 135 running on client system 130. If it is determined that a second attribute package was not selected at step 270, then transactional system 160 may proceed to step 280 and close the transaction, processing the transaction with the first attribute package. If it is determined that a second attribute package was selected at step 260, then transactional system 160 may proceed to step 280 and close the transaction, processing the transaction with the selected second attribute package.

Transactional system 160 may close the transaction upon determining that a second attribute package has been selected by the user (e.g., inputted by the user at application 135 running on client system 130) or may continue to hold the transaction open for further modification of the payment attribute package until the expiration of the predetermined period of time. As an example, the user may input, at application 135 running on client system 130, a selection of a second attribute package of the plurality of attribute packages of the user as the payment attribute package for the transaction instead of the recommended first attribute package, and transactional system 160 may close the transaction, processing the transaction with the second attribute package, as soon as it receives the user's selection of the second attribute package from application 135. In the same example, transactional system 160 may receive the selection of the second attribute package from application 135 during the predetermined period of time and may wait until the period of time expires before closing the transaction with the second attribute package.

In particular embodiments, transactional system 160 may generate a report for delivery to the user. The report may be generated at a predetermined frequency (e.g., yearly or monthly). The report may include, as an example, information regarding the benefits or conveniences of the attribute packages of the user, a summary of the utilization of each attribute package by the user, an assessment of the value each attribute package provides to the user, and one or more recommendations as to which attribute packages the user should keep or cancel and new attribute packages for which the user should apply, any other suitable transactional information, or any combination thereof. Transactional system 160 may make recommendations in the report based on the user's historical use of the attribute packages, transactions made (e.g., spending trends), third parties transacted with, location information of the transactions, benefits or value accrued over time based on transactional system 160's recommendations (e.g., additional rewards earned, benefits received, and fees or interest saved), the user's credit profile, user's household information (e.g., household income, historical use of attribute package information for one or more members of the user's household), any other suitable factors, or any combination thereof. In particular embodiments, a report may be generated ad hoc with each transaction. For example, after a transaction is initiated and a particular payment attribute package has been recommended, a report may be generated that provides, to the user, the logic behind the recommendation (e.g., top three reasons why a particular payment attribute package was recommended over other possible attribute packages).

In particular embodiments, a user may be able to access a user profile, which may include, for example, attribute packages available to the user and the particular values or benefits associated with each attribute package (e.g., rewards information or APR information, as described above), spend history for each attribute package, customer account information (e.g., address or change in address), customer account status (e.g., lost or stolen card, fraudulent transaction reported), information pertaining to other users on the account (e.g., authorized users or joint users), tools for adding/deleting attribute packages, configurable user preferences (e.g., selection of particular attribute packages to use in particular scenarios or at particular merchants), any other suitable profile information, or any combination thereof. A user may access his profile, for example, via application 135 running on client system 130.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Although this disclosure describes and illustrates particular embodiments of FIG. 2 as being implemented by transactional system 160, this disclosure contemplates any suitable embodiments of FIG. 2 as being implemented by any suitable platform or system. As an example, particular embodiments of FIG. 2 may be implemented by client system 130. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

FIG. 3 illustrates an example prompt 310 provided at an interface 300 of a client system 130. In particular embodiments, transactional system 160 may send instructions to application 135 running on client system 130 to display prompt 310 to the user of client system 130. In particular embodiments, transactional system 160 may send instructions to point-of-sale terminal 140 to display prompt 310 to the user. In the illustrated embodiment of FIG. 3, client system 130 is depicted as having ample mobile-network service, by which location information of the user may be determined and sent to transactional system 160. Accordingly, prompt 310 may be provided at, before, or after the point-of-sale. Prompt 310 may include, as shown in FIG. 3, a recommended attribute package—first attribute package 320—which may be preselected by transactional system 160 out of multiple attribute packages 340 of the user as the payment attribute package for a particular user-initiated transaction. Prompt 310 may additionally include instructions to the user to confirm first attribute package 320 as the payment attribute package or to select a different attribute package of multiple attribute packages 340 of the user.

The user may select, via interface 300 of client system 130, second attribute package 330 for processing the transaction. As described above in connection with FIG. 2, transactional system 160 may either close the transaction, processing it with the user-selected second attribute package 330, or hold the transaction open for a window of time to allow for further user modification of the payment attribute package (e.g., the user may revert his selection to first attribute package 320 or select a third attribute package). In particular embodiments, no user input may be received at interface 300 of client system 130, and transactional system 160 may hold the transaction open for the window of time and then close the transaction using first attribute package 320.

As an example, transactional system 160 may preselect first attribute package 320, which may be a retail-store credit-card account, based at least in part on location information indicating that the user has initiated a transaction at the particular retail-store location. The user may determine, however, that he would rather apply a different attribute package—second attribute package 330—which may be an airline rewards attribute package that requires a certain dollar amount of qualifying purchases be made each quarter. Transactional system 160 will then apply the second attribute package 330 to the transaction, even though the value to the user may have been greater if the first attribute package 320 had been applied to the transaction. As described in connection with FIG. 2, transactional system 160 may employ any suitable machine-learning algorithms or heuristics to determine the recommended payment attribute package (i.e., first attribute package 320) based on past user behavior (e.g., selecting the airlines reward card when a quarterly-purchase amount is close to being met or selecting the airlines reward card at the particular retail-store location). Thus, the next time the user is transacting at the particular retail-store location, transactional system 160 may determine a different recommended payment attribute package (e.g., the airline-rewards attribute package) based on past user behavior. In particular embodiments, transactional system 160 may modify its recommended payment attribute package (i.e., modify the backend logic) in response to the user, as an example, modifying the recommended payment attribute package from first attribute package 320 to second attribute package 330 at the same retail-store location a certain amount of times within a certain time period (e.g., five times in a month).

Although prompt 310 is described in a particular manner herein, prompt 310 may be represented in any suitable manner and generated using any suitable method or technique. Although prompt 310 is depicted and described as presenting a particular number of attribute packages of the user, it will be understood that this is for illustrative purposes, not by way of limitation, and that prompt 310 may present any suitable number of attribute packages of the user. It will further be understood that prompt 310 is depicted as providing certain information for illustrative purposes, not by way of limitation, and that prompt 310 may provide any other suitable information related to the transaction including, as an example, a countdown of time until the predetermine period of time expires, information about the multiple attribute packages of the user (e.g., APR information, balances, payment due dates, rewards balances, and deep links to more detailed information about each attribute package), information regarding the recommendation (e.g., the first attribute package has the lowest APR), any other suitable information regarding the transaction, or any combination thereof. It will further be understood that prompt 310 is depicted as having certain features (e.g., selectable elements for each payment attribute package), but this is for illustrative purposes, and prompt 310 may use any suitable static and/or dynamic features for presenting information or providing attribute packages for selection. As an example, prompt 310 may provide a tool that permits the user to drag or slide a transaction into a particular, selected attribute package of multiple attribute packages 340. It will further be understood that prompt 310 is depicted as being presented at an interface of application 135 running on client system 130, this if for illustrative purposes, not by way of limitation, and prompt 310 may be any suitable notification presented in any suitable way at client system 130. As an example, prompt 310 may be presented on a lock screen, a home screen, hovering over an interface of a different application (e.g., a push notification), or on an interface of application 135, and prompt 410 may be silent or accompanied by audible, tactile, or other suitable feedback. Prompt 310 may also be displayed at and interacted with via point-of-sale terminal 140.

Although this disclosure describes and illustrates particular embodiments of FIG. 3 as being implemented by client system 130, this disclosure contemplates any suitable embodiments of FIG. 3 as being implemented by any suitable platform or system. As an example, particular embodiments of FIG. 3 may be implemented by transactional system 160. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

FIG. 4 illustrates an example prompt 410 provided at an interface 400 of a client system 130. In particular embodiments, transactional system 160 may send instructions to application 135 running on client system 130 to display prompt 410 to the user of client system 130. In particular embodiments, transactional system 160 may send instructions to point-of-sale terminal 140 to display prompt 410 to the user. In the illustrated embodiment of FIG. 4, client system 130 is depicted as having no mobile-network service, so the location information of the user may not be determined and sent to transactional system 160. Accordingly, in particular embodiments, point-of-sale terminal 140 may send instructions (e.g., via BLUETOOTH) to application 135 running on client system 130 to display prompt 410 to the user of client system 130. Prompt 410 may be provided at the point-of-sale in place of prompt 310, which may only be displayed by application 135 when client system 130 has sufficient mobile-network service or internet connectivity.

Prompt 410 may provide any suitable information, including, as shown in the illustrated example of FIG. 4, an indication that a transaction has been opened and that the recommended payment attribute package has been set as the first attribute package. Prompt 410 may further include a request for a response by the user, and the requested response may be a "yes" or a "no," indicating whether application 135 should set a reminder to review the preselected payment attribute package (i.e., the recommended payment attribute package) at a later time during the predetermined window of time in which the transaction will be held pending by transactional system 160. As an example, if the user selects "yes" at prompt 410, application 135 may display to the user an interface for specifying a time for the reminder (e.g., in 20 minutes or at 2 pm) and the type of reminder to set (e.g., a silent or audible alarm or a push notification).

Although prompt 410 is described in a particular manner herein, prompt 410 may be represented in any suitable manner and generated using any suitable method or technique. It will be understood that although prompt 410 is depicted as providing certain information, this is for illustrative purposes, not by way of limitation, and that prompt 410 may provide any other suitable information related to the transaction including, as an example, a countdown of time until the predetermine period of time expires, information about the multiple attribute packages of the user (e.g., APR information, balances, payment due dates, rewards balances, and deep links to more detailed information about each attribute package), information regarding the recommendation (e.g., the first attribute package has the lowest APR), any other suitable information regarding the transaction, or any combination thereof. It will further be understood that prompt 410 is depicted as being a push notification appearing on a home screen of client system 130, this if for illustrative purposes, not by way of limitation, and prompt 410 may be any suitable notification presented in any suitable way at client system 130. As an example, prompt 410 may be presented on a lock screen, a home screen, hovering over an interface of a different application, or on an interface of application 135, and prompt 410 may be silent or accompanied by audible, tactile, or other suitable feedback. Prompt 410 may also be displayed at and interacted with via point-of-sale terminal 140.

Although this disclosure describes and illustrates particular embodiments of FIG. 4 as being implemented by client system 130, this disclosure contemplates any suitable embodiments of FIG. 4 as being implemented by any suitable platform or system. As an example, particular embodiments of FIG. 4 may be implemented by transactional system 160. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
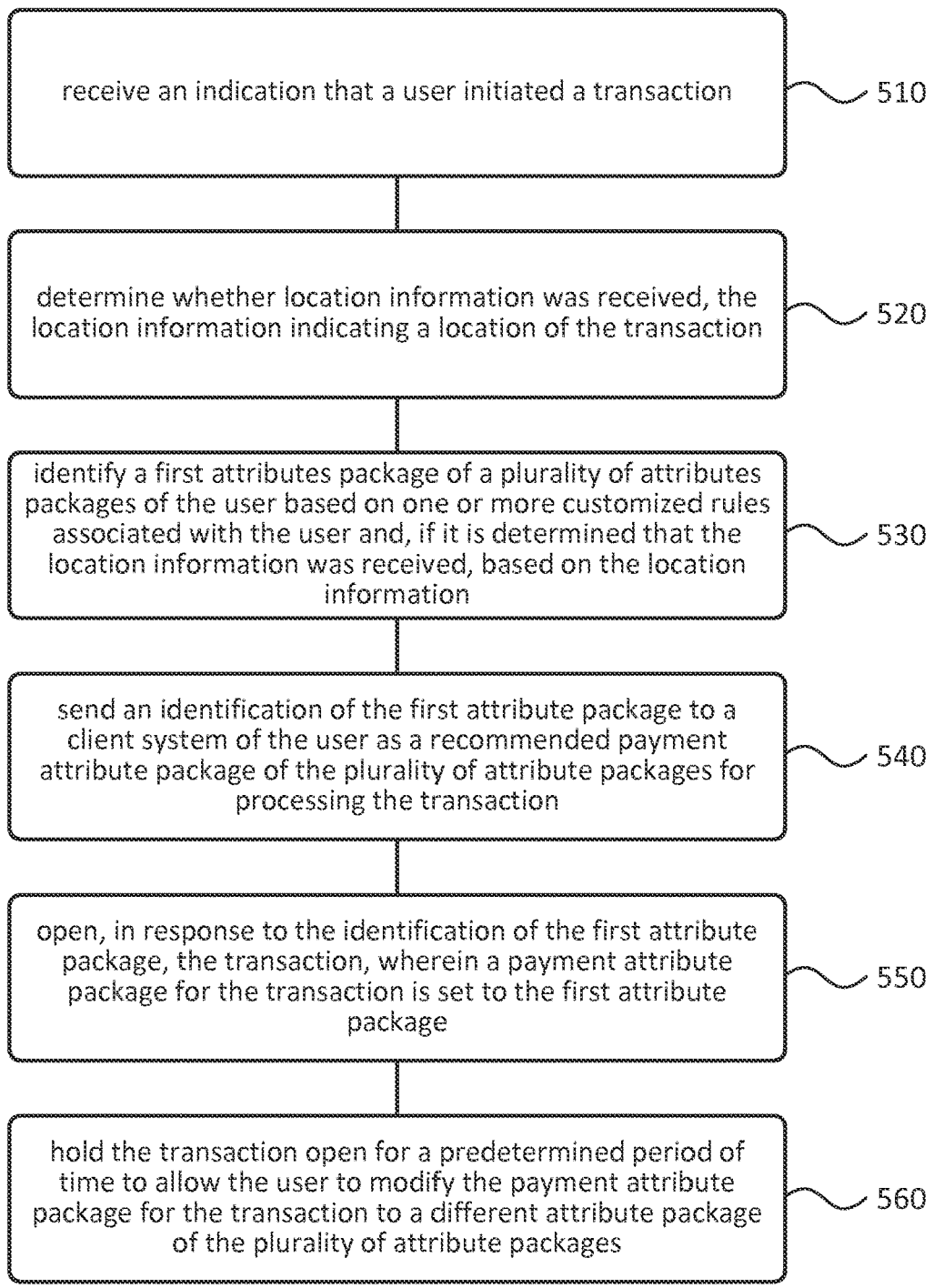
FIG. 5 is a flowchart illustrating an example method for opening a transaction.

FIG. 5 is a flowchart illustrating an example method 500 for opening a transaction. The method may begin at step 510, where an indication that a user initiated a transaction is received. At step 520, it is determined whether location information was received, the location information indicating a location of the transaction. At step 530, a first attribute package of a plurality of attribute packages of the user is identified based on one or more customized rules associated with the user and, if it is determined that the location information was received, based on the location information. At step 540, an identification of the first attribute package is sent to a client system of the user as a recommended payment attribute package of the plurality of attribute packages for processing the transaction. At step 550, in response to the identification of the first attribute package, the transaction is opened, and a payment attribute package for the transaction is set to the first attribute package. At step 560, the transaction is held open for a predetermined period of time to allow the user to modify the payment attribute package for the transaction to a different attribute package of the plurality of attribute packages. Particular embodiments may repeat one or more steps of the method of FIG. 5, where appropriate.

Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for opening a transaction, including the particular steps of the method of FIG. 5, this disclosure contemplates any suitable method for opening a transaction, including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
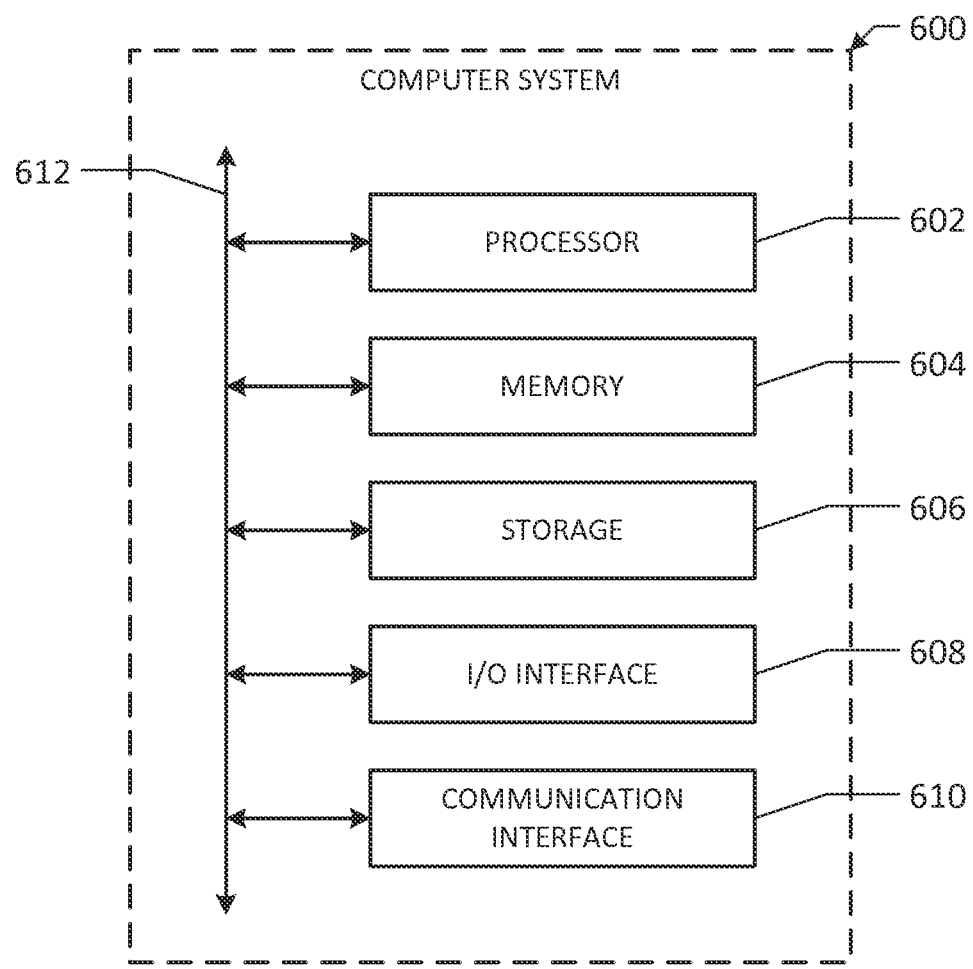
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As an example, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
    receiving, by one or more computing devices of a transactional system, an indication that a user initiated a transaction;
    determining, by the one or more computing devices, when location information was received, the location information indicating a location of the transaction;
    identifying, by the one or more computing devices, a first attribute package of a plurality of attribute packages connected with a payment card of the user based on one or more customized rules associated with the user and, when the determining indicates the location information was received, based on the location information;
    sending, by the one or more computing devices, an identification of the first attribute package to a client system of the user as a recommended payment attribute package of the plurality of attribute packages for processing the transaction, and causing a screen of the client system to display a first icon that represents the first attribute package and at least a second icon that represents a different attribute package from among the plurality of attribute packages;
    opening, by the one or more computing devices, in response to the identification of the first attribute package, the transaction, wherein a payment attribute package for the transaction is set to the first attribute package; and
    holding, by the one or more computing devices, the transaction open for a predetermined period of time to allow the user to modify the payment attribute package for the transaction to a different attribute package of the plurality of attribute packages.

2. The method of claim 1, wherein the location information is received from one or more of: an application running on the client system; the application being associated with the transactional system; or one or more short-range radio frequency devices proximate to the client system.

3. The method of claim 2, further comprising closing, by the one or more computing devices, the transaction after the predetermined period of time has expired, wherein the transaction is processed using the first attribute package.

4. The method of claim 2, wherein the sending the identification of the first attribute package comprises sending instructions to the application to display a prompt to the user, the prompt comprising a request for confirmation of the first attribute package or selection of a different attribute package of the plurality of attribute packages.

5. The method of claim 4, further comprising:
    receiving, by the one or more computing devices, a selection of a second attribute package of the plurality of attribute packages, the selection being inputted by the user at the client system during the predetermined period of time;
    setting, by the one or more computing devices, in response to the selection of the second attribute package being received, the payment attribute package for the transaction to the second attribute package; and
    closing the transaction after the predetermined period of time has expired, wherein the transaction is processed using the second attribute package.

6. The method of claim 5, further comprising:
    receiving, by the one or more computing devices, confirmation of the first attribute package, the confirmation being inputted by the user at the client system during the predetermined period of time; and
    closing the transaction in response to the requested confirmation, wherein the transaction is processed using the first attribute package.

7. The method of claim 1, further comprising sending, by the one or more computing devices, when the determining indicates no location information was received, instructions to an application running on the client system to display a prompt to the user, the application being associated with the transactional system, wherein the prompt comprises a notification of the recommended payment attribute package and that the transaction has been opened.

8. The method of claim 7, wherein the prompt further comprises a selectable element, the selectable element being operable to set a reminder for the user to modify the payment attribute package for the transaction at a time within the predetermined period of time.

9. The method of claim 7, further comprising:
    receiving, by the one or more computing devices, a selection of a second attribute package of the plurality of attribute packages, the selection being inputted by the user at the client system during the predetermined period of time;
    setting, by the one or more computing devices, in response to the selection of the second attribute package being received, the payment attribute package for the transaction to the second attribute package; and
    closing, by the one or more computing devices, the transaction after the predetermined period of time has expired, wherein the transaction is processed using the second attribute package.

10. The method of claim 1, wherein the transaction is pending during the predetermined period of time.

11. The method of claim 1, wherein at least one of the plurality of attribute packages of the user comprises a line of credit.

12. The method of claim 1, wherein at least one of the plurality of attribute packets of the user comprises a rewards attribute package for a line of credit.

13. The method of claim 1, wherein the one or more customized rules comprise user preferences inputted by the user at the client system.

14. The method of claim 1, wherein the one or more customized rules comprise a transaction history of the user.

15. One or more non-transitory computer-readable storage media embodying software that is operable when executed by a processor to:
    receive an indication that a user initiated a transaction;
    determine whether location information was received, the location information indicating a location of the transaction;
    identify a first attribute package of a plurality of attribute packages connected with a payment card of the user based on one or more customized rules associated with the user and, when the determination indicates the location information was received, based on the location information;
    send an identification of the first attribute package to a client system of the user as a recommended payment attribute package of the plurality of attribute packages for processing the transaction, and cause a screen of the client system to display a first icon that represents the first attribute package and at least a second icon that represents a different attribute package from among the plurality of attribute packages;

open, in response to the identification of the first attribute package, the transaction, wherein a payment attribute package for the transaction is set to the first attribute package; and hold the transaction open for a predetermined period of time to allow the user to modify the payment attribute package for the transaction to a different attribute package of the plurality of attribute packages.

16. A system, comprising:

one or more processors; and a memory coupled to the processors comprising instructions executable by the processors, the processors operable when executing the instructions to:

receive an indication that a user initiated a transaction;

determine whether location information was received, the location information indicating a location of the transaction;

identify a first attribute package of a plurality of attribute packages connected with a payment card of the user based on one or more customized rules associated with the user and, when the determination indicates the location information was received, based on the location information;

send an identification of the first attribute package to a client system of the user as a recommended payment attribute package of the plurality of attribute packages for processing the transaction, and cause a screen of the client system to display a first icon that represents the first attribute package and at least a second icon that represents a different attribute package from among the plurality of attribute packages;

open, in response to the identification of the first attribute package, the transaction, wherein a payment attribute package for the transaction is set to the first attribute package; and hold the transaction open for a predetermined period of time to allow the user to modify the payment attribute package for the transaction to a different attribute package of the plurality of attribute packages.

* * * * *